United States Patent [19]

Lause et al.

[11] Patent Number: 5,338,611
[45] Date of Patent: Aug. 16, 1994

[54] METHOD OF WELDING THERMOPLASTIC SUBSTRATES WITH MICROWAVE FREQUENCIES

[75] Inventors: Herbert J. Lause, Murrysville; Kristen L. Parks, Robinson Township, Indiana County; Larry D. Tanis, Kiskiminetas; David D. Leon, Murrysville, all of Pa.

[73] Assignee: Aluminum Company of America, Pittsburgh, Pa.

[21] Appl. No.: 481,296

[22] Filed: Feb. 20, 1990

[51] Int. Cl.$^5$ .............................................. B32B 27/36
[52] U.S. Cl. .................................. 428/412; 428/402; 428/500; 428/520; 428/522; 428/524; 428/473.5; 428/688; 156/272.2; 156/275.5
[58] Field of Search ............... 156/272.2, 275.5; 428/412, 473.5, 688, 402, 500, 520, 522, 524, 473.5, 688

[56] References Cited

U.S. PATENT DOCUMENTS

| | | | |
|---|---|---|---|
| 3,620,875 | 11/1971 | Guglielmo et al. | 156/272 |
| 4,069,602 | 1/1978 | Kremer et al. | 36/45 |
| 4,253,898 | 3/1981 | Rinker et al. | 156/275.7 |
| 4,529,856 | 7/1985 | Meek et al. | 156/272.2 X |
| 4,529,857 | 7/1985 | Meek et al. | 156/272.2 X |
| 4,609,417 | 9/1986 | Smith | 156/272.2 X |
| 4,906,497 | 3/1990 | Hellmann et al. | 427/207.1 X |

*Primary Examiner*—Donald P. Walsh
*Assistant Examiner*—Daniel Jenkins
*Attorney, Agent, or Firm*—Glenn E. Klepac

[57] ABSTRACT

Microwave frequencies in the range of 0.5 GHz to 10 GHz are used to weld thermoplastic substrates by interposing a carrier strip. The strip is formed of a polymer carrier which is miscible in the substrates. Electrically conductive submicron carbon black susceptor particles are chosen with specified properties such that they generate enough heat within a specified time to produce a weld in which the heat generated is confined to the weld zone. The resulting weld is such that the welded assembly has essentially the same dimensions as the clamped assembly. Glass fiber reinforced substrates are welded without breaking glass fibers in the weld zone. Lap strength of welded substrates is greater than that of substrates joined by prior art methods, whether by welding or adhesive bonding. Articles microwave welded in accordance with the invention are useful for manufacturing and repairing vehicle components such as automobile bumpers and dashboards and other structural parts of automobiles, aircraft, and spacecraft.

19 Claims, 1 Drawing Sheet

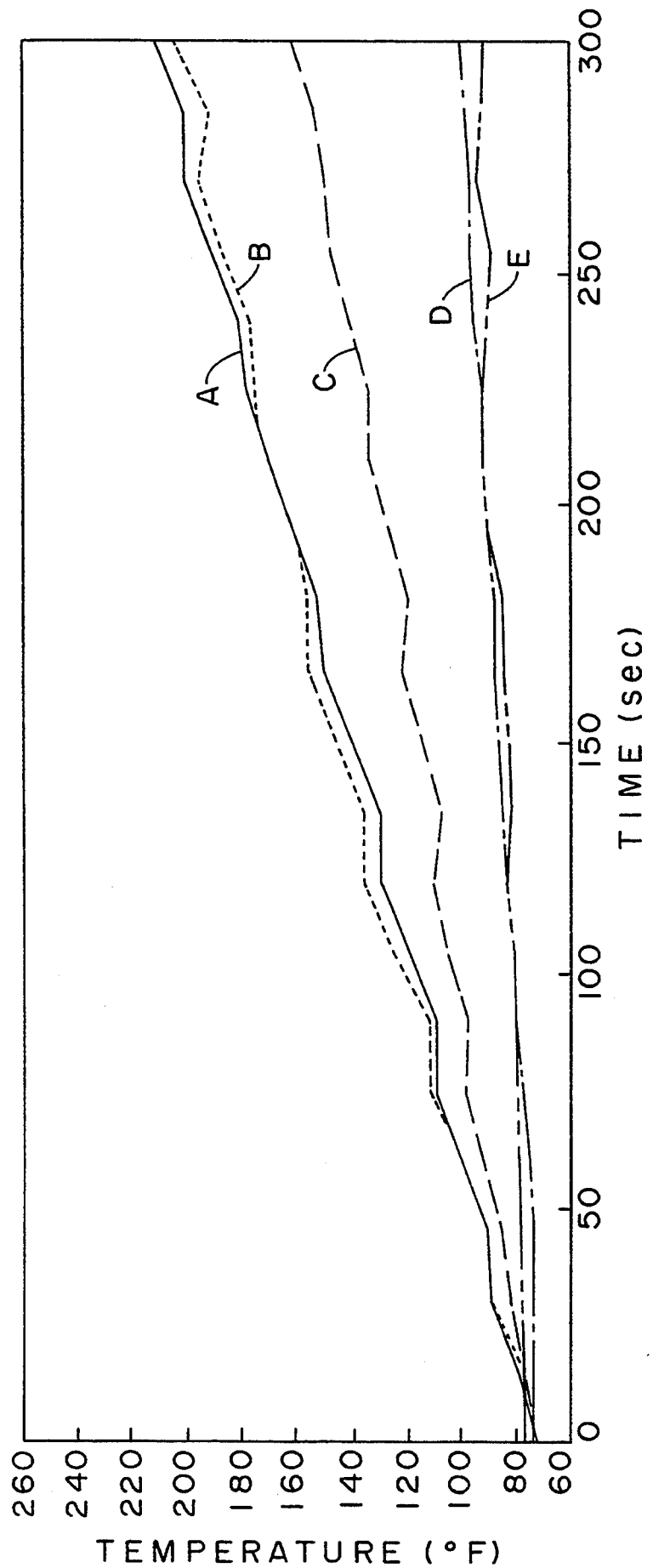

METHOD OF WELDING THERMOPLASTIC SUBSTRATES WITH MICROWAVE FREQUENCIES

BACKGROUND OF THE INVENTION

Though thermoplastic materials having highly desirable properties are now readily available at economically attractive prices in developed countries, use of such materials for the production of large shaped articles has been highly constricted. This is particularly true if the articles have complex shapes or are reinforced with glass fibers, and are too large to be molded economically. Much effort has been expended on solving the problem by adhesively bonding, fusing, or welding component pieces of a large article together, and many prior art references teach a variety of ways for doing so, with equivocal success.

This invention relates to the welding of substantially microwave-permeable substrates of thermoplastic synthetic resinous materials. By a "substantially microwave-permeable" substrate we refer to one which is sufficiently permeable to microwaves in the frequency range from about 0.5 GHz to about 10 GHz (Giga-Hertz) referred to as the "microwave region", so as to maintain the temperature outside the weld-zone below the glass transition temperature $T_g$ or the melting point $T_m$ of the polymer of the substrate (substrate polymer). The "weld-zone" typically extends into each substrate for a relatively short distance in the range from about 5 to about 20 mils from the welded interface, in a direction normal thereto.

The process more particularly comprises generating sufficient heat energy at the interface of an assembly of thermoplastic substrates to weld them together using an "interface strip", referred to as an "interstrip", and for brevity, simply a "strip". The strip comprises a fiber-free thermoplastic carrier polymer ("carrier") miscible with the substrate polymer, and homogeneously dispersed in the carrier are submicron, electrically conductive carbon black particles having high surface area, uniquely adapted to provide a successful weld. The strip serves to carry the carbon black particles and position them in the weld-zone. The carbon black particles absorb microwaves in the frequency range employed and are collectively referred to as being the "microwave susceptor".

The process is more specifically directed to welding thermoplastic substrates which have a continuous use temperature (no load) in excess of ambient (about 20° C.), and especially to such substrates which are reinforced with substantially microwave-permeable reinforcements or fillers. An assembly of substrates may be welded into a composite part for an automobile, for example a bumper or dashboard where strength and durability at an affordable cost is a primary concern; or for an aircraft or spacecraft component, typically where the composite is to be "non-observable" to radar.

Microwaves in the above-specified range are distinct from radiation in the range from about 25 KHz to about 3 MHz which produces "induction" heating; and also from radiation in the range from about 3 MHz to about 3 GHz which is broadly stated to produce "dielectric" heating. Thus it is evident there is an overlap of the lower portion of the microwave range and the upper portion of the dielectric range.

Prior art processes for bonding, fusing, adhering or welding have used electromagnetic radiation energy in each of the aforementioned ranges, with various combinations of materials and conditions under which the bond between the substrates is to be effected.

Because the process of this invention is effective only in the microwave range it is referred to as "microwave welding", or "M-welding" for brevity, and can only result in a successful weld or weldment, as defined herein, between substrates of thermoplastic synthetic resinous materials having an interposed strip or layer of miscible "weld-material", so termed because it provides both the thermoplastic carrier and the susceptor, the latter being present in a minor amount by weight of the strip. The miscible thermoplastic carrier containing the susceptor having the appropriate absorptive characteristics for a particular range of frequencies, permits a successful weld to be made when microwave energy of sufficient power and intensity is directed to the weld-zone immediately surrounding the interface where the weld-material is positioned.

Though it will be evident that the process of this invention may be used with materials which are solid at any temperature above ambient or room temperature (20° C.), this invention is most particularly concerned with materials and substrates of thermoplastic materials which are used at a temperature up to about 50° C. Such materials may be crystalline such as polyolefins, polyamides (nylon), polycarbonates and the like, semi-crystalline such as polyetherether ketone (PEEK), or substantially amorphous, such as poly(vinyl chloride) (PVC) and the like.

By the term "weld" or "weldment" we refer to a zone bounded by the substrates, in which zone the entanglement of polymer chains has progressed beyond simple, mechanical, chain entanglement. Simple, mechanical chain entanglement is obtained without the necessity of a suceptor, by pressing molten thermoplastic surfaces together while in the plastic state; or, by the use of heat energy-creating techniques, such as heating with hot air which requires that molten thermoplastic surfaces be pressed together while plastic, resulting in dimensional instability of the joint, and without introducing a susceptor in the "weld" formed.

In this regard, in the prior art, it should be noted that the term "welding" has been used synonymously with "fusion bonding" (as described in U.S. Pat. No. 4,764,328 to Matz et al, class 264/subclass 248), with "adhesive" (as described in U.S. Pat. No. 3,620,875 to Guglielmo et al, class 156/subclass 272), and with "crosslinking a heat-activated crosslinking agent" to form co-valent crosslinks between the surfaces and the polymeric constituent of the carrier in which the agent is dispersed (as described in U.S. Pat. No. 3,927,233 to Naidoff, class 428/subclass 58).

Bonding by essentially mechanical entanglement, is inaptly referred to in the prior art as a "weld", as for example in U.S. Pat. No. 4,770,735 to Shaposka et al (class 156/subclass 258) which teaches cutting a supported tube with a hot wafer, then pressing the aligned, hot cut ends together to "weld" the cut tubes. No additional material is introduced to produce a weld.

Welding of substrates is better than other assembly methods because it typically produces a stronger joint than by other methods such as adhesive bonding. Adhesive bonding is used to avoid the use of nuts and bolts, or other mechanical fastening means. Using a through-fastener requires drilling holes with the resultant generation of stresses. Using an adhesive typically requires preparation of the surfaces, and the introduction of an adhesive material which is different from that of the substrates.

Because of the complex nature of the bond between the surfaces to be welded together, the manner in which microwave energy produces a microwave-derived bond is not easily distinguished from a bond produced by other methods of non-adhesively joining the surfaces. Typically, the distinction between a microwave bond formed in a weld made with microwave radiation, and with other forms of energy, is made either by specifying how the weld is produced, or by quantifying the physical properties of the weld obtained, or both. For example, a weld can be made by friction welding, ultrasonic welding, explosive welding, as well as by electromagnetic energy generated by ultraviolet, infra-red, induction and dielectric radiation methods; but the weld obtained by our process is distinguishable over that obtained by the other processes, not only by the presence of the susceptor (in the weld-zone) which is uniquely absorptive in the aforespecified microwave range, but also by the physical properties of the weld, and the details of steps in the method used to form the weld.

A so-called "weld" may be made between materials without any regard for their phase inter-behavior, as long as the surfaces to be joined are molten. This joining of surfaces after each is in a molten state does not produce a true weld. For a successful weld, the added thermoplastic material ("carrier") of the strip must be miscible with that of the substrates. The carrier may be substantially the same polymer as that of the substrates, or different, so long as the carrier is miscible with each substrate (hence "weld-miscible").

More particularly, by "weld-miscible" polymers we refer to those which are miscible so that there is no visually evident phase separation of the polymer phases. We also refer to those materials in which the concentration of one in the other defines an upper limit of miscibility, again with the limitation that within the range of such concentration, there is no visually evident phase separation of the phases.

Our process is distinguishable over bonding caused by simple, essentially mechanical chain entanglement. A weldment or M-weld formed by M-welding results in interpenetration and diffusion of the weld-material into the surfaces of the contiguous substrates which are welded together without exertion of a large enough clamping force (on the substrates) to cause significant distortion, and thus maintains the dimensional stability of the composite formed. Such interpenetration and diffusion of the weld-material between substrates of miscible materials are characteristic of a weld between the same thermoplastic material; or, between a weld with different grades of a polymer, such as the different grades of commercially available polypropylene (PP) resins. However, materials of different chemical compositions may also be weld-miscible if they have compatible chain geometry.

A successful weldment between weld-miscible substrates is one in which the lap strength of the resulting weld is about the same as, or preferably greater than, that of either individual substrate portion. The fingerprint of a successful weld is its lap strength, measured as modulus, which is better than that of adhesion, whether by using an adhesive or by pressing together molten surfaces. As used herein the term "modulus" refers to modulus determined at a specified temperature (say 20° C.) and 100 percent elongation. In those instances where the substrates welded are of different, but weld-miscible materials, then the weldment results in a composite having strength at the weldment, equal to, or in excess of, the modulus of the weaker material.

One cannot predict whether a strip containing susceptor particles dispersed therein, will have sufficient weld-miscibility to meet the foregoing criteria. Knowing that a layer of the same, or a like polymer, as the substrates to be welded will have weld-miscibility, one cannot predict what physical properties of susceptor, and what concentration of the particles might be adequate for the purpose at hand. This purpose is to provide the requisite absoption of microwave energy sufficient to generate enough heat (measured, say, as watts/gm of susceptor) for propagating interpenetration and diffusion of the dispersed susceptor phase and also the continuous polymer phase, to an extent adequate to result in a successful M-weld. The dispersed phase also provides carbon-particle reinforcement in the M-weld. When the M-weld is between fiber reinforced substrates, the M-weld also contains the fibers of the substrates present as at least one additional dispersed phase.

It is particularly surprising that, granted that heating due to electromagnetic waves is the common physical phenomenon which results from different basic types of such energy-creating systems as magnetic energy induction, dielectric energy generation, and microwave energy generation, only the last results in successful M-welds. A weld produced by induction heating requires interposing an absorptive (for the wavelength used) material such as a metal mesh, an inorganic oxide, or powdered metal, and the presence of the magnetic-field susceptible material in the weld-zone is easily established. Carbon black particles are not susceptible to electromagnetic fields within the wavelength range of magnetic induction heaters, though some carbonaceous compositions such as silicon carbide, boron carbide, and carbon-coated metal particles are. Conventional carbon black particles are electrically non-conductive, and furnace blacks such as those used as fillers in reinforcement in rubber products such as automobile tires, are ineffective susceptors under the process conditions of our invention.

Though different from microwave energy generation only in wavelength, wavelengths in the range from 3 MHz to about 1 GHz usually used for dielectric energy generation, produce a weak weld which is readily distinguishable over an M-weld, even when the dielectric energy generation is enhanced by the presence of electrically non-conductive carbon blacks, and the high frequency electromagnetic field varied both in intensity and wavelength. The weak weld occurs because carbon particles, generally, are substantially more permeable to electromagnetic radiation in the wavelength range conventionally used for dielectric energy generation than to microwaves. Only high surface area, electrically conductive carbon black particles in the submicron range are sufficiently absorptive to produce an M-weld without deformation of the substrates.

Most important is that conventional welding by dielectric heating does not solve two of the egregious problems relating to such welding of thermoplastic substrates, namely (a) the use of a metallic or ferromagnetic filler (dielectric susceptor) in the weld-material to form the weld, and (b) the ability to weld fiber-reinforced materials in which the reduced volume of resin (percentage reduction), due to the presence of fibers, inhibits resin flow and interpenetration. When the reinforcing fibers are themselves dielectric susceptors, as for example certain types of glass fibers which are microwave-permeable, dielectric welding generates enough heat to disrupt the fiber orientation of the material. These problems are solved by M-welding.

Attempts to overcome the overheating produced in fiber reinforced composites by dielectric heating do not produce the requisite weld strength. Typically, resistance wires are placed at the bond interface in a lateral plane (say), and a potential applied across them causing the resin surface to soften. But the softening is non-uniform in the lateral plane, the depth of diffusion in the vertical plane is essentially uncontrollable, and as in implant induction heating, metallic wires are typically left in the bond interface.

Still another problem solved by M-welding relates to preparation of the surfaces of substrates to be welded. There is no preparation. M-welding proceeds with as-found, virgin or untreated surfaces, that is, ones which have not been painted or otherwise coated with material which would adversely affect the weld-miscibility of the substrates.

Ultrasonic welding relies on converting a power signal (typically 20 kHz) to ultrasonic vibrations transmitted through a metal horn, separately, to the surfaces to be joined. At the appropriate time, when the surfaces to be joined are in a plastic state, the transducer power is turned off and the surfaces clamped together. Again, such a weld relies mainly on mechanical chain entanglement, is difficult to use with reinforced carbon fiber or graphite composites because heat generated at the surface is conducted away from the weld zone. The amount of weld energy applied correlates well with the weld strength obtained. In contrast, there is no easily recognizable correlation between the strength of an M-weld, and the amount of M-wave energy applied, provided the amount of energy is sufficient to cause substantial interpenetration of the substrates.

Friction welding, vibration welding, heated tool welding and hot gas welding are still other methods which have been used in the prior art, but each of them fails to produce a weld which has substantially the same modulus as that of the substrate because none provides the necessary interpenetration and diffusion in excess of that obtained by simple mechanical chain entanglement.

M-welding, alone among electromagnetic heat energy generating methods, produces an acceptable M-weld when the substrate polymers are miscible, the weld zone contains electrically conductive carbon black particles, and the source is an ultra-high frequency electromagnetic energy source, in the range from about 0.915 GHz to about 10 GHz, the intensity (power required) being varied depending upon the geometry and mass of the M-weld to be made.

In U.S. Pat. No. 3,620,875 to Guglielmo (class 156/subclass 272), a thin layer of a like thermoplastic material containing particulate electromagnetic energy absorbing metals and metal alloys having ferromagnetic particles dispersed therein, is interposed between the opposite surfaces of sections of substrates, and adhesively bond the opposite surfaces by subjecting the sections to an electromagnetic field of sufficient power and frequency to inductively heat the dispersed particles. Since there is no mention of his having used microwaves, though he was aware of their effect, as stated in his specification (see col. 2, lines 14–27), he clearly, deliberately chose dielectric heating for his purpose. He found that when he inductively heated the iron powder in his extruded thermoplastic ribbon of adhesive, the sections of substrates on either side of the ribbon were intimately fused to the bonding layer (ribbon). Since he dispersed the ferromagnetic particles uniformly in his stiffening layer he heated the entire layer essentially uniformly until it softened controllably, so as to be adhesively bonded without regard for the miscibility of the thermoplastic in the material to which it was adhered. Ferromagnetic particles do not lend themselves to be controllably heated in a microwave field.

As is well known, high frequency dielectric heating of fibrous materials impregnated with thermoplastic materials and metal particles, is conventional for the purpose of bonding the heated material to another. But microwave heating cannot be arbitrarily substituted for dielectric heating because it is known that each has a different and unpredictable effect on any particular system.

Microwave heating was employed in U.S. Pat. No. 4,069,602 to Kremer (class 36/subclass 45) to join a fibrous layer of thermoplastic material impregnated with carbon black or graphite particles, to an "upper" (in a shoe) material of leather or synthetic resin without significantly heating it (the leather or resin). He discovered he could stiffen the leather upper by heating the impregnated fibrous layer until it softened, so quickly that he did not damage the leather which was far more permeable to the microwaves he used, than his fibrous layer. The result was simply adhesive bonding between the impregnated fibrous layer and the leather rather than a weld as described hereinabove. It is clear the fibrous layer was not welding anything to the leather, nor could it; and, was not welding anything to the synthetic resin, since there are only two components in his system, namely, (1) the fibrous layer of stiffening material, and, (2) the leather of the shoe upper he wished to stiffen (or synthetic resin, if the shoe upper was not made of leather). In contrast, we have a three-component system in which we weld at least two substrates together using a strip of carrier containing carbon black particles, the strip being susbtantially free of fibers; and it is essential that our carrier be weld-miscible in the substrates.

SUMMARY OF THE INVENTION

It has been discovered that substrates of a thermoplastic material which is permeable to microwave radiation, may be welded together by microwave energy ("M-welded") in the frequency range from about 0.5 GHz to about 10 GHz by interposing at the interface of the substrates to be welded, and in contact with opposed surfaces of the substrates, a fiber-free "interstrip" (or "strip" for brevity) of a miscible thermoplastic material containing, homogeneously dispersed therein, an electrically conductive microwave-absorptive particulate carbon black ("microwave-susceptor"). The strip positions the carbon black where the weld is to be made. The weld is usually made in less than a couple of minutes with an energy source of adequate power while maintaining the substrates and strip in pressing contact under pressure sufficient to cause entanglement of polymer chains of each substrate with those of the strip, but insufficient pressure to deform the substrates. Such a weld results in a composite of essentially the same dimensions as the assembly of substrates, and the weld is made without exceeding the glass transition temperature $T_g$, or the melting point $T_m$, of either substrate polymer outside the weld-zone. When one or both substrates are reinforced with substantially microwave-permeable reinforcement and/or fillers, typically organic or inorganic fibers, the weld is made without breaking the reinforcing fibers in the weld zone.

It is therefore a general object of this invention to provide a method for microwave-welding ("M-welding") an assembly of first and second substrates of mutually miscible thermoplastic materials, comprising, separating the substrates with a strip consisting essentially of a miscible thermoplastic material containing an amount, effective for the purpose at hand, of an electrically conductive, particulate carbon black having particles smaller than about 100 nm (nanometers) and a surface area in the range from about 100 m²/g to about 2000 m²/g; exerting sufficient pressure on the assembly to maintain the strip, which does not extend beyond the weld-zone, in contact with opposed surfaces of the substrates; exposing the assembly to microwave radiation in the frequency range from about 0.5 GHz to about 10 GHz with sufficient power, for a time long enough to form a weldment in which the surfaces of the substrates have carbon black particles occluded at their interface, the thermoplastic material of the strip forms a single phase with that in the weld-zone, and there is essentially no deformation of either substrate.

It is a specific object of this invention to provide the foregoing method for M-welding in which the strip is coextensive with the surfaces to be M-welded, so that, while making the weld, the substrates in the weld zone are non-uniformly heated in a plane at right angles to the plane of their interface, the temperature diminishing from a maximum in the weld zone, to a minimum near the outside distal surfaces of the substrates, without heating material outside the weld-zone above the $T_g$ or $T_m$ of the substrate polymer.

It is also a specific object of this invention to provide a method for M-welding fiber-reinforced substrates of miscible thermoplastic materials using electrically conductive carbon black particles having the above-specified characteristics as well as a calculated real permittivity "EPSR" in the range from about 3 to 25, and an imaginary relative permittivity "EPSI" in the range from about −0.4 to about −30. Such susceptor particles are capable of generating heat in an amount from about 5 to about 50 watts/gm of susceptor in the strip, which heat generation is effective to provide a weld in less than 2 min. This method results in an essentially void-free weld having carbon black particles carried into opposed surfaces of each substrate for a distance demonstrably greater than that obtained by mechanical polymer chain entanglement.

It is also a specific object of this invention to provide a shaped article of arbitrary size and shape consisting essentially of at least two sections of thermoplastic substrates, optionally reinforced with glass fibers, welded together by microwave energy in the wavelength from about 0.3 cm to about 30 cm (corresponding to a frequency from about 0.5 GHz to about 10 GHz), after interposing between, and in contact with the sections to be welded, an arbitrarily shaped strip having an average thickness of less than about 50 mils and formed from a like thermoplastic polymer as the sections, the strip having dispersed therewithin, electrically conductive particles of microwave-absorptive carbon black particles, which strip serves to carry the carbon black particles and position them in the weld-zone, where the weld is to be made.

It is another specific object of this invention to provide a continuous process for M-welding an assembly of first and second substrates between which is firmly pressed a continuous strip of a like thermoplastic material having substantially uniformly dispersed therein, susceptor particles of electrically conductive carbon black in the size range from about 1 to about 50 nm average particle diameter, containing less than 5% by wt volatiles, the susceptor being present in an amount from about 1 to about 20 percent by weight of the strip; the assembly is continuously exposed to microwave radiation in the range specified above, so as to form a welded article of arbitrary length, having an essentially void-free weld-zone.

It is yet another specific object of this invention to provide an M-weld between fiber-reinforced composites in which the M-weld is about twice as strong as a conventional induction weld, measured as lap strengths.

BRIEF DESCRIPTION OF THE DRAWINGS

The foregoing and other objects and advantages of our invention will appear more fully from the following description, made in connection with the accompanying drawing wherein:

The FIGURE is a graph in which curves are plotted for carbon black samples, all of which are generally designated as being electrically conductive, comparing the samples to determine their relative absorptivity as evidenced by Time/Temperature curves generated at the same predetermined power rating (1.25 KW) for microwave radiation at 2.45 GHz in a microwave oven, and the same susceptor weight (1 part by wt per 100 parts of mineral oil carrier) in each sample.

DETAILED DESCRIPTION OF PREFERRED EMBODIMENTS

In a preferred embodiment this invention relates to the M-welding of fiber-reinforced substrates to form, in a typical example, a structural composite. The term "composite" is used herein to refer to a structure comprising plural substrates M-welded together. Each substrate comprises a thermoplastic polymer having a relatively high dielectric constant (for an organic polymer), preferably in the range from about 2 to 5, which characterizes the polymer as being sufficiently microwave-permeable to avoid being heated to a temperature high enough to cause distortion of the substrates. Distortion of the substrates causes loss of dimensional stability of the composite. A suitable substrate polymer is a polyolefin, poly(vinyl chloride) ("PVC"), polycarbonate, poly(methyl methacrylate), polyamide (nylon), polystyrene, polyetherimide, polyarylene sulfone, polyphenylene sulfide, polyphenylene oxide ("PPO"), polysulfone, polyether sulfone, or polyetherether ketone ("PEEK"). Other suitable polymers are ethylene/propylene copolymers, including carboxylated olefin polymers; vinyl chloride copolymers, e.g. with vinyl acetate; and copolymers of styrene with conjugated dienes.

One specific use for an M-welded composite is for a bumper on an automobile. A preferred material for M-welding such a bumper is a polypropylene ("PP") commercially available as AZDEL ®. Another specific automotive use is for M-welding multi-colored, typically tri-colored, lenses of high density polyolefin which is adequately stabilized against degradation by heat, light and actinic radiation. Such lenses are typically made from poly(methyl methacrylate) by adhesively bonding appropriately colored and water-white lens components, but the resulting adhesively bonded structure is weaker than one which is M-welded. Irregularly shaped lighting fixtures are M-welded from a polycarbonate commercially available as LEXAN®, or a polycarbonate/polyester blend commercially available as XENOY®. Polymers having a dielectric constant lower than 2 are unsuitable as the entire substrate heats up to a temperature at which deformation of the composite is inititated.

Heating due to absorption of microwave energy depends not only on dipole polarization but also on interfacial or ionic polarization. Most preferred substrates are non-polar thermoplastic polymers, and blends of a major proportion by weight of a non-polar polymer with a minor amount of a polar polymer, so that the effective dielectric constant of the blend is in the range from about 3 to 5. Since increasing polarity of the polymer results in higher absorptivity of the substrate, the less polar the homopolymer, the copolymer, or the components of the blend used, the better. Whether the thermoplastic polymer in a substrate is amorphous or crystalline is of no significance provided it is substantially microwave-permeable.

Less preferably, structural composites may be formed by M-welding fluorocarbon polymers, polyamides (nylons), certain polyurethanes and chlorinated poly(vinyl chloride), and blends of one of the foregoing first thermoplastic materials with a second which has a lower continuous use temperature than the first, for example, a blend of PPO with polystryene. The common characteristic of a substrate to be welded is that when reinforced with fibers it is essentially void-free; and the substrate has a continuous use temperature (no load) in excess of 30° C., preferably in excess of 100° C.

The invention is most preferably used to make welds such as are made to fabricate automobile bumpers, body panels for vehicles and other composite shapes, and to repair broken or deteriorating sections of structural aircraft or spacecraft elements. Such repairs are presently made by any one of several techniques, for example by using ferrite particles and inductive heating, or by ultrasonic welding, friction welding, vibration welding and hot gas welding. In general, the M-weld of this invention dispenses with the necessity of providing a physical lock between components, e.g. a key, inside, flush or plain lock, or a press or snap fit, because a plain lap, offset lap, or strapped butt joint, is more than satisfactory. It will be evident that a physical lock which holds the carbon black-impregnated interstrip (or "strip") at the interface to be welded, will provide desirable autopressurization which may dispense with the need to use an external pressure-exerting means such as a clamp.

An interstrip or "strip" of this invention is conveniently formed by mixing the desired amount of electrically conductive carbon black susceptor particles with a carrier of choice in a mixer, such as a Brabender, at or above a temperature above the $T_g$ or $T_m$ of the carrier, to obtain pellets in which the susceptor is homogeneously dispersed. If a strip is to be made with PP as the carrier, a Brabender with a sigma rotor hot mixing head at 200° C. (392° F.) is used and the susceptor essentially homogeneously distributed in pellets. The pellets are then extruded, hot-pressed between platens, or otherwise thermoformed at a temperature below that at which degradation of the carrier occurs, into a strip of arbitrary cross-section in a desired average thickness, typically less than 50 mils. Such a strip is flexible and readily conforms to the contours of the interface of substrates between which it is sandwiched.

In one specific embodiment, a first substrate of polypropylene ("PP") reinforced with glass fibers in an amount from about 20 percent by weight (% by wt) to about 40% by wt of the substrate, is welded to a second such PP substrate to form a lap weld, by first interposing in the weld zone, between and in contact with opposed virgin surfaces of the substrates, a strip of PP containing superfine submicron carbon black susceptor particles having less than 5% by wt volatiles, capable of the aforespecified heat generation, and a surface resistivity less than 1000 ohm·cm/cm, preferably less than 100, and most preferably from about 1–10 ohm·cm/cm, measured for a uniform 10% by wt dispersion of particles in PP homopoymer.

Measurement of heat generation is done as follows: 10 g of each sample is mixed in 100 g of mineral oil (long chain aliphatic fatty acid, Squibb intestinal lube mineral oil) inside a PP container which has essentially no absorption. The mixture is placed inside a commercially available GE microwave oven, Model No. J E1445001, Ser. No. FV9244433Z and subjected to 5 mins of radiation at 2.45 GHz and full power (about 1.25 KW). The temperature of the mixture is monitored every 15 secs. Tests which resulted in a mixture temperature of 250° F. before 5 mins were aborted, the mix cooled to room temperature and the test restarted at 10% less power load. Those mixtures still showing high absorption rates at the 10% power rating were further diluted to 5 g per 100 g of mineral oil, or to 1 g per 100 g of mineral oil, if the mixture was highly absorptive. Since the most highly absorptive carbon blacks were desired, the 1 g/100 g formulation was used to provide the results grahically illustrated in the appended FIGURE.

Referring to the FIGURE, curves A, and B are for samples of carbon black mixtures coded RWL-1, and RWL-2 respectively, obtained from Akzo Chemie. Curves C, D and E are for samples of carbon black mixtures coded RWL-21, RWL-29 and RWL-30 respectively, obtained from Degussa. The slope of the Time/Temperature curves are correlated to key properties of the carbon blacks tested to determine which parameters resulted in adequate heat generation per unit weight to produce the desired M-weld. Such key properties include surface area ($m^2/g$); particle size (nm) and % volatiles.

It is evident that the slopes of the curves A, B and C are substantially greater than the slopes of curves D and E, the latter showing an unsatsifactory rate of heat generation. To make a successful M-weld the heat generation measured in the foregoing test should be sufficient to raise the temperature of the mixture 30° F. in 30 secs using 2.45 GHz at 1.25 KW.

If desired, a substrate may include additional fillers such as clay particles, hollow glass microspheres and the like, all of which are microwave-permeable.

The assembly of first and second substrates with the interposed strip is then lightly clamped with microwave-permeable clamps, and exposed to microwave radiation in the aforespecified frequency range.

Unless specifically referred to as "magnetic permeability", by the general use of the term "permeable" we refer both to substantial permeability (which determines response to the magnetic component in equation I below) as well as permittivity to microwave frequencies in the aforespecified range. Preferably the microwaves are at a frequency of about 2.45 GHz which is the frequency reserved for industrial, scientific and medical uses of the shorter radio waves, though some industrial applications prefer to use 0.915 GHz. As applied to the clamps, we refer to their being microwave-permeable since it is essential to avoid heating the outside surfaces of the assembly to a temperature above the $T_g$ or $T_m$ of the polymers of the substrates, depending upon whether the polymers are substantially non-crystalline (less than 10% crystallinity), such as PVC; or semicrystalline, such as PEEK; or substantially crystalline (more than 80% crystallinity), such as polypropylene PP.

The requisite interpenetration by diffusion of polymer chains of carrier into the substrates is produced by the "electric" ("E") component, and not the "magnetic" ("H") component of the frequency range which produces the necessary microwave heating in a short enough time to produce a successful weld. It is well known that the range for microwave heating (more correctly, "Maxwell heating") is distinguishable over that for resistive heating, capacitve heating, and induction heating.

More specifically the "E" component of dielectric heating is defined by the equation $$\text{curl } E = -j\omega\mu' H$$

while the "H" component is defined by the equation $$\text{curl } H = \sigma_e E + j\omega\epsilon_e E$$

wherein
E = intensity of the electric field
H = intensity of the magnetic field
$\sigma$ = conductivity
$\mu'$ = permeability
$\epsilon$ = permittivity
$\omega$ = frequency
j = refers to the imaginary part of the property in question.

It is essential to recognize that the microwave heating used herein is not similar to induction heating, and that the electrically conductive carbon black particles used as the susceptor herein cannot be conventionally inductively heated under practical conditions in a microwave-permeable carrier in less than 2 minutes without heating the substrate outside the weld zone excessively.

Any conventional technique for generating the microwaves may be used, such as klystron and magnetron generators and travelling wave oscillators. The power output of such generators may be varied in accordance with the size (and particularly, cross-section) of the substrates to be welded and the mass of susceptor particles in the interstrip. The ouput may vary from about 0.5 Kw (kilowatts) to 100 Kw, but typically a range from about 1 Kw to about 10 Kw will be adequate for the purpose at hand.

It will be recognized that the length and width of the strip will be such as to be coextensive with the interface between the substrates to be welded, but the strip's thickness will generally vary within relatively narrow limits because, after the weld is completed, there is to be substantially no deformation of the assembly due to incorporation of the carrier into the substrates. The dimensions of the strip are not narrowly critical provided, after the M-weld is completed, the strip is incorporated into the substrates without noticeably affecting the thickness of the overlapping portions of the substrates where the weld is made. It is not desirable to have more carrier and carbon particles than is necessary to produce a successful weld. Typically, the strip will be less than 50 mils thick, and more preferably from about 5 to 30 mils thick. As will be appreciated, the carrier will most preferably be the same material as that of the substrates, to ensure making a successful weld.

The type of glass fiber reinforcement is not narrowly critical and may be in the form of filaments, or fibers, or strands made from collected fibers, or from fibers bundled into yarns, or woven into mats or cloth, all of which forms of glass fiber reinforcement are presently commercially available and routinely used for the production of structural glass fiber reinforced composites.

Particular reference is made herein to glass fibers for reinforcement because carbon and graphite fibers (the terms 'carbon' and 'graphite' are used interchangeably in this specific instance to refer to all the forms of such commercially available reinforcement), may be used in only relatively low amounts, in the range from about 1% to about 20% by weight may be used, so as to insulate adjacent carbon fibers to avoid arcing in the substrate. Similarly, the amount of any other fiber reinforcement, for example an aramid fiber, or filler that is less microwave-permeable than glass fibers, will typically be limited by the extent to which the substrate is heated outside the weld zone during M-welding.

Though as little as 5% by wt glass fibers provide substantial reinforcement in a composite, most preferred are composites containing from about 10% to about 60% by wt. It is most desirable, however, that such composites be essentially void-free as evidenced by their failure in "cohesive failure" by which we refer to failure due to tearing of resin from resin (PP from PP, say), rather than tearing of resin (PP) from glass fiber surface, this latter being referred to as "adhesive failure". Such cohesive failure is thus predicated upon the resin's properties rather than those of the fiber reinforcement.

It is particularly surprising that electrically conductive carbon black susceptor particles in the carrier are highly absorptive in the aforesaid range of microwave frequencies, thus selectively heating the carrier above its $T_g$ or $T_m$, because carbon blacks which result in a surface resistivity (in PP) greater than about 100 ohm·cm/cm are not such good susceptors. It is also surprising that exposure of carbon fiber-reinforced substrates to the microwaves in the power range used, does not heat the substrates sufficiently to raise the temperature of PEEK above its $T_m$ outside the weld zone, provided there is no arcing between fibers.

The frequency chosen for a particular application will depend upon numerous factors in addition to the choice of fiber reinforcement and the polymers in the assembly, including non-interference with designated band frequencies, convenience for commercial applications and the like, but it is critical that upon completion of the weld, the carrier vanishes by being incorporated into the substrates. The M-weld of our invention is characterized by having higher lap strength than can be obtained by prior art methods, and by being visually distinguishable (under adequate magnification in an electron microscope) from other types of prior art welds in that ours leaves carbon particles which have penetrated a distance of many hundred, and generally, thousands of chain lengths.

The magnetic relative permeability, both real ("MUR") and imaginary ("MUI") components, appears to provide no clue as to how effective the carbon particles might be for the purpose desired, but quite unexpectedly it has been found that effective susceptor particles with the aforementioned properties also have a real relative permittivity "EPSR", and an imaginary relative permittivity "EPSI", each in the range from about 8 to about 80 for microwave frequencies in the aforesaid range of 0.5 to about 10 GHz. This narrow range of permittivity is provided by particles having a high BET surface area of at least 100 m²/g, and preferably in the range from about 500 m²/g to about 1000 m²/g, which is provided by superfine submciron particles. Preferred are susceptors having primary particles with an average diameter of less than 100 nm. Carbon black particles having relatively low surface area, and in the size range from 0.1 micron and above, have permittivities which are too low, generally less than 8, and therefore are not sufficiently absorptive to produce the desired selective heating effect in the weld zone to produce a successful weld. Most preferred are particles in the range from about 10 to about 80 nm. Particles greater than 1 micron in average diameter are many orders of magnitude larger than ones we use and generally produce unacceptably inferior results.

In addition, it is most desirable to have carbon black particles having a relatively low level of volatiles, namely less than about 5% by wt, and preferably in the range from about 0.1 to about 2% by wt volatiles.

Any suitable source of dielectric frequency in the desired range, and of sufficient power output and intensity may be employed. For most welds, a power output in the range from about 0.1 to about 20 Kw will generally be sufficient, though large assemblies may require higher power outputs up to about 50 Kw. In practice, both the field strength and the frequency are chosen in relation to the particular resin and reinforcement, and also the size and shape of the substrates to be welded so as to provide a successful weld in less than about 2 minutes, usually in the range from about 1 sec to about 1 min.

The apparatus used for producing the weld is commercially available, and is conventional except for features relating to the specific types of welds to be made. The apparatus for producing a successful weld forms no part of the present invention.

To make a simple lap weld 0.5 inch wide between end portions of two elongated substrates of about 0.125" (inch) thick glass fiber reinforced fiber PP, is sandwiched a 0.5" wide strip, 20 mils thick, between the end portions where the weld is to be made. The assembly is clamped with quartz clamps and placed in a conventional microwave oven operating at 2.45 GHz with a power output of 1250 watts, for about 1 minute. The carrier of the strip is heated above the carrier's $T_g$ or $T_m$, polymer chains of carrier and particles of carbon black diffuse into the contiguous surfaces of the substrates, and upon cooling, effect a successful weld. The thickness of the welded composite, measured across the weld zone is 0.250" indicating that there is no noticeable distortion of the welded composite due to incorporation of the strip.

In another embodiment of this invention, glass fiber reinforced polyetherimide substrates are welded together in a manner analogous to that described hereinabove. Those skilled in the art will appreciate that the filaments of glass are sized in accordance with the specific resin in which they are to be used so as to produce a substantially void-free substrate which fails in cohesive failure. The sized glass in the form of strands, both continuous and chopped, and in the form of mat or cloth and roving, are typically used. Though as little as 5% by wt glass fibers provide substantial reinforcement in a composite, most preferred are composites containing from about 10% to about 80% by wt glass.

The most preferred composites have a relatively high reinforcing fiber content in the range from 60–80% by weight, and there is very little resin near the surface of each substrate whether reinforced with graphite, glass or organic polymers such as aramid fibers. As a result, at the interface of two such substrates there is very little resin available to produce a successful weld. Yet our invention does so.

In another specific embodiment, the invention is used to continuously weld relatively short laminar sections of PEEK reinforced with graphite fiber into a single unitary panel of arbitrary length.

EXAMPLES

Sets of two glass fiber reinforced Azdel® PP substrates each 0.5" wide, 0.125" thick and 2" long were welded with lap joints, the length of each lap being 0.5" in a GE microwave oven generating 2.45 GHz with a power output of 1250 Kw. All samples were welded for the same time (30 sec) at the 'high' setting. A strip of PP, 50 mils thick and containing 10% by weight of susceptor particles, was inserted in the interface of each set, and lightly clamped with less than 50 psi pressure before being welded.

The Table below lists the load at peak, the stress at peak, and the calculated Young's modulus for each composite of 7 welded sets of substrates when tested in an Instron mechanical tester.

TABLE

| No. | load at peak (lb) | stress at peak (psi) | Young's modulus (ksi) |
|---|---|---|---|
| 1 | 635.7 | 1271 | 63.9 |
| 2 | 733.4 | 1467 | 84.5 |
| 3 | 658.3 | 1317 | 82.6 |
| 4 | 674.9 | 1350 | 90.4 |
| 5 | 778.3 | 1557 | 93.8 |
| 6 | 651.8 | 1304 | 86.6 |
| 7 | 771.8 | 1544 | 91.6 |

Mean lap strength is 1401 psi with a standard deviation of 119. In all instances, the welded joint is stronger than the substrate as evidenced by failure of each welded composite outside the joint.

Lap strengths of about 1000 psi have been reported for Azdel® welded by dielectric heating, and 600 psi for adhesive bonds made with the same material.

Having thus provided a general discussion, described the exceptional lap strength imparted to a weldment of two substrates of a polymer using the strip of miscible polymer carrying an electrically conductive carbon black having the designated heat-generating capability, and set forth specific illustrations of the invention in support thereof, it is to be understood that no undue restrictions be imposed by reason thereof, except as provided by the following claims.

We claim:

1. A method for welding substrates of a thermoplastic synthetic resinous material, comprising,
   (a) interposing between said substrates, in contact with each, in a weld-zone in which a weld is to be made, a strip comprising a thermoplastic carrier polymer miscible with said material, said carrier having dispersed therein from about 1% to 20% by weight of submicron electrically conductive carbon black particles which are absorptive to microwave frequencies in the range from about 0.5 GHz to about 10 GHz, which have a surface resistivity less than 100 ohm·cm/cm, and a BET surface area of at least about 100 m²/g, said substrates and strip forming an assembly;

(b) subjecting said assembly to an electromagnetic field having sufficient power in said frequency range to heat said assembly non-uniformly, the temperature diminishing from above the glass transition temperature $T_g$ or melting point $T_m$ of said material near said interface, to below said $T_g$ or $T_m$ outside said weld-zone; and, (c) terminating exposure of said assembly to said field when said carrier vanishes by forming a single phase with said thermoplastic material of said substrates;

whereby said weld is made without substantial deformation of said substrates in said assembly.

2. The method of claim 1 wherein said carbon black particles have a real relative permittivity "EPSR" in the range from about 3 to 25, and an imaginary relative permittivity "EPSI" in the range from about −0.4 to about −30, and are capable of generating heat in an amount from about 5 to about 50 watts/gm of susceptor in the strip, which heat generation is effective to provide a weld in less than 2 minutes.

3. The method of claim 2 wherein the average primary particle size of said carbon black particles is in the range from about 1 to about 100 nanometers.

4. The method of claim 3 wherein the volatiles content of said carbon black particles is below about 5% by weight.

5. The method of claim 4 wherein at least one of said substrates is reinforced with glass fiber reinforcement present in an amount in the range from about 5% to about 60% by weight.

6. The method of claim 4 wherein said carbon particles interpenetrate said substrates, in a direction at right angles to the plane of said layer, for a distance of at least 100 microns.

7. The method of claim 4 wherein the said thermoplastic material is selected from the group consisting of a polyolefin, polyimide, polycarbonate, poly(methyl methacrylate), polyarylene sulfone, polyphenylene sulfide, polyphenylene oxide (PPO), polysulfone, polyether sulfone, and polyetherether ketone (PEEK).

8. The method of claim 7 wherein at least one of said substrates is reinforced with carbon fiber reinforcement present in an amount in the range from about 1% to about 20% by weight.

9. A method for continuously welding fiber-reinforced substrates of thermoplastic synthetic resinous material, comprising, (a) continuously overlapping sections of substrates to provide an interface at which a continuous weld is to be made;

(b) interposing at said interface, in contact with each substrate, in a weld-zone in which said weld is to be made, a strip having an average thickness in the range from about 5 to about 50 mils comprising a thermoplastic carrier polymer miscible with said material, said carrier having dispersed therein from about 1% to 20% by weight of submicron electrically conductive carbon black particles which are absorptive to microwave frequencies in the range from about 0.5 GHz to about 10 GHz, have a surface resistivity less than 100 ohm·cm/cm, and a BET surface area of at least 100 m²/g, said substrates and strip forming an assembly;

(c) continuously moving said assembly while subjecting a portion thereof to an electromagnetic field having sufficient power in said frequency range to heat said assembly non-uniformly, the temperature in said weld-zone diminishing from above the glass transition temperature $T_g$ or melting point $T_m$ of said material near said interface, to below said $T_g$ or $T_m$ outside said weld-zone;

(d) terminating exposure of said assembly to said field when said carrier vanishes by forming a single phase with the thermoplastic material in said weld-zone; and, (e) cooling said weld-zone to form a composite having essentially the same dimensions as said assembly.

10. The method of claim 9 wherein said carbon black particles have a real relative permittivity "EPSR" in the range from about 3 to 25, and an imaginary relative permittivity "EPSI" in the range from about −0.4 to about −30, and are capable of generating heat in an amount from about 5 to about 50 watts/gm of susceptor in the strip, which heat generation is effective to provide a weld in less than 2 minutes.

11. The method claim 10 wherein at least one of said substrates is reinforced with glass fiber reinforcement present in an amount in the range from about 5% to about 60% by weight.

12. The method of claim 10 wherein the said thermoplastic material is selected from the group consisting of a polyolefin, polyimide, polycarbonate, poly(methyl methacrylate), polyarylene sulfone, polyphenylene sulfide, polyphenylene oxide (PPO), polysulfone, polyether sulfone, and polyetherether ketone (PEEK).

13. The method of claim 12 wherein at least one of said substrates is reinforced with carbon fiber reinforcement present in an amount in the range from about 1% to about 20% by weight.

14. A shaped article suitable for use as a structural vehicle component and consisting essentially of at least two sections of a fiber-reinforced material welded together by microwave energy in the frequency range from about 0.5 GHz to about 10 GHz, said article being formed by interposing between and in contact with said sections in a weld-zone, a strip having an average thickness in the range from about 5 to about 50 mils comprising a thermoplastic carrier polymer miscible with said material, said carrier having homogeneously dispersed therein from about 1% to 20% by weight of submicron electrically conductive carbon black particles which are absorptive to microwave frequencies in said range, which particles have a surface resistivity less than 100 ohm·cm/cm, a BET surface area of at least 100 m²/g, and an average primary particle size smaller than about 100 nanometers, said strip functioning to position said carbon black particles in said weld-zone; subjecting said weld-zone to an electromagnetic field having sufficient power in said frequency range to heat said assembly non-uniformly, the temperature in said weld-zone diminishing from above the glass transition temperature $T_g$ or melting point $T_m$ of said material near said interface, to below said $T_g$ or $T_m$ outside said weld-zone; terminating exposure of said assembly to said field when said carrier vanishes by forming a single phase with the thermoplastic material in said weld-zone; and, cooling said weld-zone to form said article having essentially the same dimensions as that of said assembly.

15. The shaped article of 14 wherein said carbon black particles have a real relative permittivity "EPSR" in the range of about 3 to 25, and an imaginary relative permittivity "EPSI" in the range from about −0.4 to about −30, and are capable of generating heat in an amount from about 5 to about 50 watts/gm of susceptor in the strip, which heat generation is effective to provide a weld in less than 2 min.

16. The shaped article of claim 15 wherein at least one of said substrates is reinforced with glass fiber reinforcement present in an amount in the range from about 5% to about 60% by weight.

17. The shaped article of claim 15 wherein the said thermoplastic material is selected from the group consisting of a polyolefin, polyimide, polycarbonate, poly(methyl methacrylate), polyarylene sulfone, polyphenylene sulfide, polyphenylene oxide (PPO), polysulfone, polyether sulfone, and polyetherether ketone (PEEK).

18. The shaped article of claim 17 wherein at least one of said substrates is reinforced with carbon fiber reinforcement present in an amount in the range from about 1% to about 20% by weight.

19. The shaped article of claim 14 comprising a structural component of an automobile, aircraft, or spacecraft.

* * * * *